United States Patent
Hainzlmaier et al.

(10) Patent No.: US 9,368,030 B2
(45) Date of Patent: Jun. 14, 2016

(54) METHOD FOR MAKING AVAILABLE ROUTE INFORMATION BY MEANS OF AT LEAST ONE MOTOR VEHICLE

(71) Applicant: AUDI AG, Ingolstadt (DE)

(72) Inventors: Andre Hainzlmaier, Geisenfeld (DE); Walter Streit, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/442,561

(22) PCT Filed: Apr. 9, 2013

(86) PCT No.: PCT/EP2013/001043
§ 371 (c)(1),
(2) Date: May 13, 2015

(87) PCT Pub. No.: WO2014/075747
PCT Pub. Date: May 22, 2014

(65) Prior Publication Data
US 2015/0339921 A1 Nov. 26, 2015

(51) Int. Cl.
*G08G 1/09* (2006.01)
*G08G 1/0967* (2006.01)
(Continued)

(52) U.S. Cl.
CPC ............ *G08G 1/0967* (2013.01); *G08G 1/0112* (2013.01); *G08G 1/0133* (2013.01); (Continued)

(58) Field of Classification Search
CPC ................. G08G 1/096791; G08G 1/096775; G08G 1/096783; G08G 1/096805; G08G 1/096833; G08G 1/096844; G08G 1/096872; H04L 67/104
USPC ............ 340/905, 425.5, 438, 441, 901, 902, 340/990–992, 995.1–995.23, 825.52; 701/23–28, 70, 96, 98, 117, 408, 409, 701/468, 521, 522, 532, 533, 538, 539, 701/540; 709/218, 219; 455/414.1, 41, 455/456.1, 466.6, 457, 557
See application file for complete search history.

(56) References Cited

U.S. PATENT DOCUMENTS

| | | |
|---|---|---|
| 6,546,330 B2 | 4/2003 | Fushiki et al. |
| 6,721,650 B2 | 4/2004 | Fushiki et al. |

(Continued)

FOREIGN PATENT DOCUMENTS

| | | |
|---|---|---|
| CN | 1317422 | 10/2001 |
| CN | 1372230 | 10/2002 |

(Continued)

OTHER PUBLICATIONS

Chinese Office Action dated Dec. 31, 2015 in corresponding Chinese Patent Application No. 201380059033.7.

(Continued)

*Primary Examiner* — Steven Lim
*Assistant Examiner* — Mancil Littlejohn, Jr.
(74) *Attorney, Agent, or Firm* — Staas & Halsey LLP

(57) ABSTRACT

Current route information about a traffic situation and/or the state of the route itself is made available. A communication link to a peer-to-peer network is set up by a communication device of a motor vehicle, and the motor vehicle is signed on to said peer-to-peer network as a subscriber of the peer-to-peer network, with the result that a communication address of the motor vehicle can be determined by at least one other subscriber of the peer-to-peer network. Furthermore, in each case an interrogation relating to the route information is received by the communication device from the at least one other subscriber. The route information itself is determined by a sensing device of the motor vehicle and is then transmitted to the interrogating subscriber by the communication device.

20 Claims, 1 Drawing Sheet

(51) Int. Cl.
*H04L 29/08* (2006.01)
*G08G 1/0968* (2006.01)
*G08G 1/01* (2006.01)

(52) U.S. Cl.
CPC ............ *G08G1/0141* (2013.01); *G08G 1/0145* (2013.01); *G08G 1/096716* (2013.01); *G08G 1/096741* (2013.01); *G08G 1/096775* (2013.01); *G08G 1/096791* (2013.01); *G08G 1/096811* (2013.01); *H04L 67/104* (2013.01)

(56) References Cited

U.S. PATENT DOCUMENTS

| | | | | |
|---|---|---|---|---|
| 6,801,837 | B2* | 10/2004 | Carlstedt | G08G 1/161 |
| | | | | 701/1 |
| 6,999,754 | B2* | 2/2006 | Hashimoto | G08G 29/12216 |
| | | | | 340/990 |
| 8,285,447 | B2* | 10/2012 | Bennett | B60W 30/08 |
| | | | | 280/5.518 |
| 2002/0120389 | A1 | 8/2002 | Fushiki et al. | |
| 2003/0060232 | A1 | 3/2003 | Hashimoto et al. | |
| 2003/0125874 | A1 | 7/2003 | Fushiki et al. | |
| 2003/0212567 | A1 | 11/2003 | Shintani et al. | |
| 2004/0167710 | A1* | 8/2004 | Fushiki | G08G 1/0104 |
| | | | | 701/532 |
| 2006/0046741 | A1* | 3/2006 | Loesch | H04L 29/12216 |
| | | | | 455/456.1 |
| 2010/0250243 | A1 | 9/2010 | Schalk et al. | |
| 2010/0324781 | A1* | 12/2010 | Gagliano | B60G 17/0165 |
| | | | | 701/39 |
| 2014/0195112 | A1* | 7/2014 | Lu | B60G 17/015 |
| | | | | 701/37 |
| 2014/0297116 | A1* | 10/2014 | Anderson | H02K 5/12 |
| | | | | 701/37 |

FOREIGN PATENT DOCUMENTS

| | | |
|---|---|---|
| DE | 19604084 | 10/1996 |
| DE | 102010021665 | 1/2011 |
| DE | 102010009760 | 9/2011 |
| DE | 102010022707 | 12/2011 |
| DE | 102011106295 | 1/2012 |
| DE | 102012022207.6 | 11/2012 |
| EP | 1631103 | 3/2006 |
| EP | 2244105 | 10/2010 |
| WO | 2010/076146 | 7/2010 |
| WO | PCT/EP2013/001043 | 4/2013 |

OTHER PUBLICATIONS

Jedrzej Rybicki et al., "PeerTIS—A Peer-to-Peer Traffic Information System," VANET'09, Sep. 25, 2009, pp. 23-32.
Jedrzej Rybicki et al, "Challenge: Peers on Wheels—A Road to New Traffic Information Systems," MobiCom'07, Sep. 9-14, 2007, pp. 215-221.
Shiao-Li Tsao et al., "Design and Evaluation of a Two-Tier Peer-to-Peer Traffic Information System," IEEE Communications Magazine, vol. 49, Issue 5, May 2011, pp. 165-172.
Abderrahmane Lakas et al., "Geocache: Sharing and Exchanging Road Traffic Information Using Peer-to-Peer Vehicular Communication," IEEE WC Spring, May 2011, 7 pages.
German Office Action for German Priority Patent Application No. 10 2012 022 207.6, issued Jan. 2, 2013, 9 pages.
German Office Action for German Priority Patent Application No. 10 2012 022 207.6, issued Apr. 4, 2013, 6 pages.
English Language International Search Report for PCT/EP2013/001043, mailed Jun. 18, 2013, 2 pages.
WIPO English Language Translation of the International Preliminary Report on Patentability for PCT/EP2013/001043, downloaded from WIPO website on May 13, 2015, 10 pages.

* cited by examiner

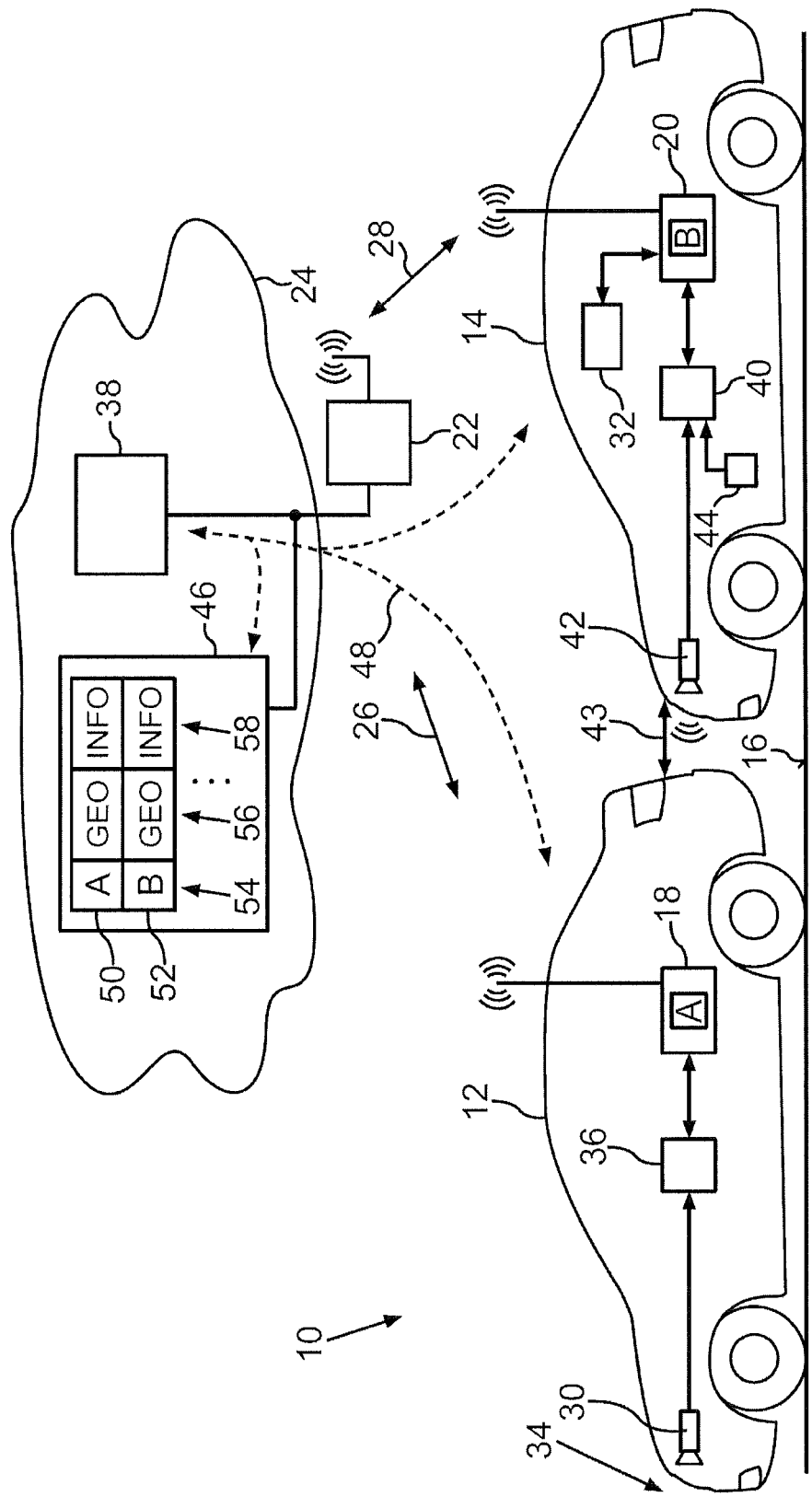

METHOD FOR MAKING AVAILABLE ROUTE INFORMATION BY MEANS OF AT LEAST ONE MOTOR VEHICLE

CROSS REFERENCE TO RELATED APPLICATIONS

This application is based on and hereby claims priority to International Application No. PCT/EP2013/001043 filed on Apr. 9, 2013 and German Application No. 10 2012 022 207.6 filed on Nov. 13, 2012, the contents of which are hereby incorporated by reference.

BACKGROUND

The invention relates to a method for making available current traffic information about a traffic situation on a route and/or about the state of the route.

In order to determine route information, at least one motor vehicle which is located on the route is used. A method of this type is known, for example, from DE 10 2010 022 707 A1.

According to the method known from this document, image data of a multiplicity of locations is recorded by a multiplicity of image-recording devices which are each arranged in a vehicle. In addition, the respective location and the time of the recording are registered. The image data is analyzed, and details of a specific category, for example petrol prices of a gas station which can be recognized in the image data are extracted from the image data. This extracted information is transmitted to a central database where it is made available for outputting to other vehicles.

DE 10 2011 106 295 A1 discloses that information data originating from motor vehicles and describing a traffic state is transmitted to a central service provider. The latter can be used to change and to add to the information data in order to calculate traffic information therefrom for a traffic information system.

The information which comes together in a central data server must generally be compiled to a large degree in order to acquire traffic information which is informative for the many drivers who receive this traffic information. However, this causes details which can be useful for individual drivers in certain situations to be lost. It is therefore helpful for a driver to experience in the short term what is happening further ahead, for example in a traffic jam, or what road conditions are currently present in the secondary roads of a specific destination owing to the current weather situation.

In conjunction with the transmission of files between two personal computers via the Internet it is known to transmit such data via what is referred to as a peer-to-peer network. A peer-to-peer network permits a computer to make a search request relating to a specific name of a file in the peer-to-peer network. The computer then learns via the peer-to-peer network on which other computer of the peer-to-peer network a file with such a file name is stored. For this purpose, the network address of the computer with the file is transmitted to the searching computer. The searching computer can then transmit an interrogation relating to the transmission of the file to the network address and therefore obtain the file from the other computer.

SUMMARY

One potential object is to make available route information about a traffic situation on a route and/or route information about the state of the route itself.

The inventors propose that a peer-to-peer network can also be operated in such a way that it can be used to search in a targeted manner for a specific motor vehicle which can directly make available the searched-for route information because it is currently located on the route. For this purpose, a car fleet is linked to a peer-to-peer network. The method correspondingly relates to the mode of operation of the individual motor vehicles. According to the method, a communication device of such a motor vehicle, that is to say, for example, the mobile radio device thereof, and an Infotainment system which is coupled thereto, sets up a communication link to a peer-to-peer network, and the motor vehicle is signed in to said peer-to-peer network as a subscriber of the peer-to-peer network. As a result, a communication address of the motor vehicle, that is to say, for example, its IP (Internet protocol) address can be determined by at least one other subscriber of the peer-to-peer network. The peer-to-peer network can be structured hierarchically, i.e. can have a central network server or else can be formed in a decentralized fashion from subscribers with equal rights.

However, the motor vehicle is not only a passive subscriber of the peer-to-peer network but also a source for the route information. For this purpose, the route information is determined by a sensing device of the motor vehicle: this can be done, for example, in that camera data of a camera (that is to say video images or still images) and/or sensor data of other sensors of the motor vehicle are sensed by the motor vehicle and make available as the route information.

If an interrogation relating to the route information is then received by the communication device via the peer-to-peer network from another subscriber of the peer-to-peer network, the determined route information is transmitted to this interrogating subscriber by the communication device. The motor vehicle therefore behaves similarly to a computer of the Internet in a peer-to-peer network for files, that is to say, for example, a computer of the "Napster" peer-to-peer network. However, instead of the otherwise customary files with music data, the current route information is made available.

The proposed method has the advantage that real time information about quite specific points on a specific route, that is to say, for example, further ahead in a traffic jam, can be obtained from another motor vehicle or else from a smartphone and a route selection or else a driving behavior can be correspondingly dynamically adapted. By avoiding (bypassing) traffic jams or roads which are blocked at short notice it is therefore not only possible to save fuel and time but also ultimately to promote a relaxed attitude on the part of the driver as a result of fluid progress on a route. However, it can, for example, also contribute to a relaxed attitude on the part of the driver if a driver who is already in the traffic jam can search in the peer-to-peer network, via, for example, his smartphone or his Infotainment system, for a motor vehicle which is further ahead in the traffic jam, in order to obtain an impression about the cause of the traffic jam. If he finds such a vehicle, the driver can, for example, request camera images from this motor vehicle and have them displayed on a screen, in order to be able to estimate whether the traffic jam will break up soon.

In order to be able to search in a more targeted way for specific route information, the method can be developed as follows. Description data of the motor vehicle which makes available the route information in the peer-to-peer network for retrieval is expediently transmitted by the motor vehicle to the peer-to-peer network at least once, preferably repeatedly at predetermined time intervals. Such description data of the motor vehicle typically indicates, for example, the type of route information which is made available by the motor vehicle and/or a current position of the motor vehicle. By the type of the route information it is indicated here whether the route information is, for example, camera data, data of a rain sensor or else a traffic report, derived from data, relating to the traffic situation. Such a traffic report can be determined, for example, from an average speed of a motor vehicle. Transmitting the description data provides the advantage that another subscriber of the peer-to-peer network can detect from which motor vehicle on a route said subscriber can request which route information.

As already stated, the route information can be, for example, sensor data relating to the surroundings of that motor vehicle which makes available the route information. In other words, a direct access to, for example, camera data or other sensor data of the motor vehicle by other subscribers of the peer-to-peer network is made possible.

It has proven particularly suitable if the sensor data is sensed by the sensing device of the motor vehicle by at least one of the following sensors: a camera, a rain sensor, a thermometer, a distance sensor for determining a distance from a motor vehicle traveling ahead or motor vehicle traveling behind, or a speed sensor which determines the velocity of the motor vehicle. On the basis of sensor data of these sensors, information about the traffic volume or the quality of the route (for example snow, wetness, dirt, obstacles on the roadway or road closures, a width of the road) can be determined by another subscriber of the peer-to-peer network without a complex analysis of the sensor data having to be carried out for this purpose in the motor vehicle itself which makes available the route information. It is therefore possible for an interrogating subscriber to check via the peer-to-peer network with respect to different sections of a route, for example, whether they are covered in snow or, for example, flooded after a downpour. If the areas in which the interrogating subscriber is interested are very small, presently it is unlikely that the subscriber will be able to obtain this information via a weather service or a traffic information service, for example.

The sensor data is preferably transmitted in anonymized form. For this purpose, an embodiment of the method provides that in the event of the route information comprising at least one camera image, at least one predetermined object, for example a vehicle number plate and/or a face, is searched for and made unidentifiable in the at least one camera image by an image processing device. The receiver of the camera image can then no longer recognize these objects. The image processing device can in this context be a component of the motor vehicle which makes available the route information or else can also be a component of another device via which the route information is transmitted to the other subscriber of the peer-to-peer network. In this context, it may be, for example, a central network server of the peer-to-peer network which exchanges the data between the subscribers of the peer-to-peer network via the Internet. The object search can be based on an automatic object recognition system which is known per se, such as a system which is used, for example, in conjunction with face recognition in photographs.

A particular advantage of the method is that very individual information items can also be taken into account, which is not possible in the case of central information services, since these must compile the collected information in order to generate a generally valid traffic report. In contrast, with the method, there is provision according to one quite particularly advantageous development that, instead of or in addition to the sensor data, an input of a route report is also received from a person located in the motor vehicle, that is to say, for example, a personal assessment of the traffic situation from the point of view of this person, by the sensing device in the motor vehicle which makes available the route information. This route report is then output as a component of the route information to the communication device which then makes it available in the peer-to-peer network. It is therefore possible, for example, for a driver of the motor vehicle to indicate as a route report: "traffic jam just breaking up". This message can then be received by further motor vehicles which are still in the traffic jam. Likewise, a driver can report that a specific road is of a particularly poor quality because dirt has been left on it, for example, by an agricultural vehicle or construction site vehicle. This information which is valid only for a very small route section can then also be made available to other vehicles via the peer-to-peer network.

A further, particularly advantageous development provides that the route report is received as a speech signal by the sensing device, i.e. the person can simply dictate their report. The speech signal is then converted into text data with speech-to-text technology. The person is then not distracted from the events on the road when they are writing the route report. In addition, the transmission of text data requires a significantly smaller bandwidth than the transmission of a speech signal.

Another form of route information is generated according to one embodiment of the method in that an analysis device of the motor vehicle determines operating data of the motor vehicle which is dependent on a driving behavior of the motor vehicle. For example, an acceleration behavior of the motor vehicle or the average velocity thereof can be analyzed. On the basis of the operating data, a component of the route information can then be formed. This provides the advantage that the actual operating data, that is to say sensor data or data from control units does not have to be transmitted to other subscribers of the peer-to-peer network but instead straight away the more compact analysis data with a finished analysis result is transmitted. This reduces the bandwidth required for transmitting the route information in the transmission. It is therefore possible, for example, to analyze the activity of an active chassis on a very uneven section of road and to draw conclusions therefrom about the road quality, and then transmit a corresponding signal, which describes the road quality, as route information. This provides very brief information, while the individual control signals of the active chassis provides a much greater amount of data.

It is particularly expedient if a specific indication of a traffic jam or backed-up traffic is output straight away as route information by the analysis device. For this purpose, according to one development of the method it is checked whether a frequency of braking maneuvers within a predetermined time period is greater than a limiting value and/or a distance from another motor vehicle and/or a speed of the motor vehicle is less than a minimum value. If at least one of these conditions is satisfied, a traffic jam or at least backed-up traffic is signaled by the analysis device. The specified speed can be an instantaneous speed or else a mean value which is formed from a plurality of speed values which are determined at different predetermined points in time. The distance can also be an instantaneous value or a mean value composed of a plurality of distance values which are determined at predetermined points in time.

Of course, a motor vehicle which makes available route information in the peer-to-peer network can also receive route information from other motor vehicles and make said information useable for a driver of the motor vehicle. Correspondingly, one development of the method provides that such an interrogation is output to at least one other motor vehicle by a display device of the motor vehicle, and route information which is generated by the at least one other motor vehicle is received, and the received route information is displayed. If a plurality of route information items is interrogated by different motor vehicles and correspondingly received, it is also possible to provide that these route information items are firstly analyzed and a result of the analysis is displayed, that is to say for example an indication of a traffic jam, if the route information of an overwhelming number of the motor vehicles indicates a reduced velocity and/or a short distance between the motor vehicles.

The inventors also propose a server arrangement of the Internet, that is to say an individual computer or else a group of several computers which can be accessed via the Internet. The server arrangement is configured to transmit a respective interrogation relating to route information to at least one motor vehicle which is signed in as a subscriber of a peer-to-peer network and carries out an embodiment of the method, and then to receive respective route information from each motor vehicle. The server arrangement is configured to transmit, as a function of all the received route information, a route report to at least one user of the server arrangement, that is to say, for example a driver of a specific motor vehicle or else a user of a smartphone which communicates with the server arrangement. Such a server arrangement can be made available, for example, in a road traffic department which, by the current route information of the motor vehicles, can react more quickly to current conditions and, for example, can remove obstacles as quickly as possible from a roadway or else can also warn other car users in more detail about the location and the type of obstacle. Previously, such monitoring of route sections has been possible only with the aid of inspection journeys or else from cameras which are mounted on bridges, i.e. in a stationary fashion, on specific route sections. The server arrangement then permits flexible checking of the state of the route to be carried out at all the locations at which a motor vehicle which is signed into the peer-to-peer network is situated. The route report can also be information relating to an alternative route if it is detected on the basis of the route information that the user of the server arrangement can reach a predetermined destination more quickly if he takes the alternative route because, for example, a traffic jam is blocking the originally envisaged route.

Another embodiment of the server arrangement provides for interrogations to be transmitted to a plurality of motor vehicles and for respective route information to be received therefrom and for the received route information to be compiled according to a predetermined processing rule to form a route report. Therefore, in the way already described, by sensing collecting and analyzing route information relating to sections of road, it is possible, for example, to calculate mean values and therefore also to generate and pass on report-like information about a specific route.

In this context it is also advantageously possible to provide that a value relating to the urgency of the route report is determined, and the route report is transmitted to at least one predetermined user only if the value satisfies a predetermined urgency criterion. The urgency criterion can preferably be predefined by the individual users, with the result that the latter can determine when they receive the route report. If a user is, for example, interested in making quick progress on a specific route, he can already bring about the transmission of the route report by a corresponding urgency criterion if on the basis of the route information it is detected by the server arrangement that the average speed on a specific route section is lower than a value which is predefined by the user as an urgency criterion. If, on the other hand, a user is interested only in hearing about serious traffic obstructions, the user can predefine as the urgency criterion that he wishes to receive a route report only in the case of a traffic jam or backed-up traffic.

The inventors further propose a motor vehicle. The motor vehicle is configured, according to one embodiment, to make available route information in the way described in a peer-to-peer network according to an embodiment of the method. A further embodiment of the motor vehicle provides that said motor vehicle is at least configured to receive route information from the peer-to-peer network. Said motor vehicle can in this context also make available route information itself in the peer-to-peer network or else can also be configured only as a receiver of such route information. A further embodiment of the motor vehicle provides that it is configured to receive a route report, as has already been described, from an embodiment of the server arrangement, and to output said route report to a driver of the motor vehicle. An embodiment which is particularly preferred in this context provides for the route report to be output as an acoustic signal and for said route report to be converted when necessary from text form into the speech signal by text-to-speech technology. The outputting of speech instructions to the driver provides the advantage that it is ensured that the driver is not distracted by, for example, video information about other sections of the route.

As already stated, a smartphone, a tablet PC or else a personal computer or home computer can also be used as a further receiver for the route information. With such devices it is also possible to subscribe to a peer-to-peer network and receive route information from other subscribers. In order to be able to correspondingly retrofit a mobile terminal such as, for example, a smartphone or a tablet PC or else a personal computer, according to one aspect a computer program product is made available with a program code which is stored on at least one storage medium and which is configured, when executed by a mobile terminal or a personal computer, to output to at least one motor vehicle a respective interrogation relating to the route information and to receive respective route information from each motor vehicle and/or to request and receive a route report from an embodiment of the server arrangement. This provides the advantage that with the mobile terminal or a personal computer, the user thereof can even be provided outside a vehicle with information about possible events on a planned route, such as for example total closure of a freeway or even a proposal of an alternative route.

A development of the computer program product provides that calendar data of an appointment database of the mobile terminal or of the personal computer are evaluated to the effect that when the user of the mobile terminal or personal computer is expected to be on a specific route and then in a predetermined time period before this appointment route information is interrogated relating to the individual route sections of this route from motor vehicles located there via the peer-to-peer network, and said route information is made available to the user or else a route report relating to the individual route sections is also requested from a server arrangement at the given points in time.

In the text which follows, the proposals will be explained once more in more detail with reference to a specific exemplary embodiment. In the example, the described components of the embodiments and the method each present individual features which are to be considered independently of one another and which each also develop the proposals independently of one another and therefore can also be considered as components, individually or a combination other than that shown. Furthermore, further features which have already been described can also be added to the described embodiments.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows a schematic illustration of a motor vehicle fleet 10, of which a motor vehicle 12 and a motor vehicle 14 are illustrated in the FIGURE.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE shows a schematic illustration of a motor vehicle fleet 10, of which a motor vehicle 12 and a motor vehicle 14 are illustrated in the FIGURE. The motor vehicles 10, 12 may be, for example, passenger cars. The motor vehicle fleet 10 can comprise further motor vehicles. The motor vehicles 12, 14 are located on a route 16, that is to say, for example, a road such as a freeway or a federal highway. Further motor vehicles of the motor vehicle fleet 10 can also be located on the route 16 or else on other routes. Within the motor vehicle fleet 10 it is made possible for the individual motor vehicles, that is to say also the motor vehicles 12 and 14, to be able to access anonymized camera data/sensor data from other fleet vehicles. This makes it possible, for example as a driver of one of the motor vehicles 12, 14 of the motor vehicle fleet 10 in a traffic jam situation, to be able to better estimate how serious a driving delay due to the traffic jam is expected to be and correspondingly to propose an alternative route at an early stage. The alternative route can in turn also be selected through the transmission of corresponding information about traffic volume and the quality of the route (for example snow, wetness, dirt, obstacles on the roadway or road closures, width of the road).

For an exchange of camera data and/or sensor data, the motor vehicles 12, 14 of the motor vehicle fleet 10 each have a communication device 18, 20. The communication device 18, 20 can be, for example, a mobile radio module, for example according to the UMTS, GSM or LTE standards or else also for example can be a WLAN module (WLAN—Wireless Local Area Network).

The communication device 18, 20 can also be a car-to-car communication device.

In the present example it is assumed that the communication devices 18, 20 are mobile radio modules which exchange the data with a mobile radio network 22. The communication devices 18, 20 are connected to the Internet 24 via a respective mobile broadband Internet connection 26, 28 using the mobile radio network 22, for example a UMTS network or LTE network or GSM network.

The motor vehicle 12 has a sensor 30 which can be, for example, a video camera, an ultrasonic sensor or a radar sensor. A driver of another motor vehicle, for example here the motor vehicle 14, can have sensor data of the sensor 30, for example video images of an area 34 in front of the motor vehicle 12 which the driver of the motor vehicle 14 cannot see himself from the motor vehicle 14, displayed by a display unit 32 of the motor vehicle 14, for example an Infotainment system or a combination instrument of the motor vehicle 14. The sensor data of the sensor 30 is for this purpose read out from the sensor 30 by a sensing device 36 of the motor vehicle 12. The sensing device 36 can be, for example, a control unit or else a software module which can be made available, for example, in an Infotainment system of the motor vehicle 12. The sensing device 36 can additionally have an image processing system which ensures that vehicle number plates and faces are made unidentifiable in the video data before transmission from the motor vehicle 12 via the Internet connection 26, in order to ensure the anonymity of vehicles and drivers. The sensor data which is made available for the transmission is then transmitted by the sensing device 36 to the communication device 18 which transmits the sensor data to the mobile radio network 22 via the Internet connection 26. In the case of a WLAN connection, the data is correspondingly transmitted to the WLAN. The sensor data which is output represents route information.

The motor vehicle 12 and the motor vehicle 14 can be connected via a peer-to-peer connection, the important part of which is then the internet connections 26, 28. However, it is also possible to provide that a central collecting station 38 is made available which receives the sensor data and where the data is collected and analyzed on a server of the collecting station 38 before its goes back again to other motor vehicles such as the motor vehicle 14. The collecting station can be a server computer which is connected to the Internet 24 or else a group of a plurality of server computers. Further traffic analyses, which are brought about by specific interrogations from the motor vehicle fleet 10 can also be carried out by the collecting station 38. For example, the motor vehicle 14 can also have a sensing device 40 which is comparable in its function with the sensing device 36 of the motor vehicle 12. With the sensing device 40 of the motor vehicle 14 it is also possible to receive sensor data of a sensor 42, for example an ultrasonic sensor, or else also signals from a control unit 44. The sensor 42 can measure, for example, a distance 43 from the motor vehicle 12 traveling ahead. By the control unit 44 it is possible, for example, to display how quickly the motor vehicle 14 is currently traveling or whether it is currently braking. The sensing device 40 transmits this information to the communication device 20, which transmits it to the collecting station 38 via the Internet connection 28. The information which is output also represents route information.

The collecting station 38 receives further data of this type, for example also from the motor vehicle 12 and further motor vehicles of the motor vehicle fleet 10. Through the sensing, collection and analysis of data on the route 16, the collecting station 38 forms mean values of, for example, the velocity of the motor vehicles and the average distances between them, and generates therefrom report-like information (route report) about the respective route 16, which is then passed on to individual motor vehicles. In the case of the motor vehicle 14, this route report can be received by the display device 32 and, for example, output to the driver by speech instructions if a critical value for the mean value is reached, and such a setting has been made by the driver of the motor vehicle 14. It is therefore also ensured that the driver of the motor vehicle 14 is not distracted by video information about other routes apart from his own. The report-like information can also be calculated by the motor vehicle 14 itself from a communication with a plurality of other motor vehicles. This can also be carried out by the display device 32.

So that camera data of the camera 30 can be displayed in the motor vehicle 14 by the display device 32, and therefore the collecting station 38 for the route 16 can make contact with the correct motor vehicles 12, 14 for the determination of the required sensor data, in the example a peer-to-peer server 46 is made available. The peer-to-peer server 46, the motor vehicles 12, 14 and the collecting station 38 form nodes of a peer-to-peer network 48 which is represented in the FIGURE by the logic paths as dashed lines. The peer-to-peer network 48 can be formed, for example, on the basis of one of the "Gnutella" or "JXTA" standards. However, it is also possible to make available a protocol which is specially designed for the described application and by which individual network subscribers can find out the identity of other network subscribers in order to be able to retrieve route information originating from these other network subscribers.

The peer-to-peer server 46 stores, for the formation of the peer-to-peer network 48 relating to the motor vehicles 12, 14 as subscribers 50, 52 to the peer-to-peer network 48, in each case a subscriber data record in which in each case a network address 54, an instantaneous location 56 and information 58 about the route information which can be retrieved by the respective subscribers 50, 52 are stored. In order then to display a camera image of the camera 30, for example by the display device 32, a search interrogation (data record with search instruction) is transmitted to the peer-to-peer server 46 by the display device 32 via the communication device 20. The data record of the search interrogation contains the information indicating for which route 16 and for which route section on the route 16 a subscriber of the peer-to-peer network 48 which makes available camera images is being sought. The peer-to-peer server 46 then searches the subscriber data records of the subscribers 50, 52 for a subscriber data record which satisfies the specified search criterion. In the present example, the peer-to-peer server 46 has found the subscriber data record of the subscriber 50, that is to say of the motor vehicle 12, and transferred the address 54 of the communication device 18 of the motor vehicle 12 to the motor vehicle 14. In the FIGURE, the address is symbolically "A". The address can be an IP address or some other identification number. For example it is possible to provide that individual subscribers of the peer-to-peer network 48 exchange data only indirectly via the server 46 or the server 38.

The peer-to-peer server 46 has then transmitted the network address 54 to the motor vehicle 14 via the Internet connection 28, with the result that it was subsequently possible to set up, for example, a peer-to-peer connection directly to the motor vehicle 12 by the display device 32 via the communication device 20. Via this connection, the display device 32 has transmitted an interrogation (that is to say an interrogation data record with an interrogation relating to the desired route information) which causes the sensing device 36 to transmit image data of the camera 30 to the motor vehicle 14 via the communication device 18.

In precisely the same way, a group of those motor vehicles 12, 14 can be determined by the collecting station 38 in that corresponding searching enquires are transmitted to the peer-to-peer server 46 by the collecting station 38. The peer-to-peer server 46 and the collecting station 38 can also be made available in a single server.

In conjunction with the setting up of a peer-to-peer network 48 it is also possible to provide that drivers of individual motor vehicles 12, 14 which are located on the same route 16 inform one another by brief automatically generated route reports (using speech-to-text technology). Such messages can relate, for example, to the quality of an alternative route or to obstacles or special features. As a result, the social character of car driving is also reinforced, in particular within the same motor vehicle fleet 10, if it is formed, for example, by motor vehicles of a specific type (trucks or sports cars of a specific type).

The example shows how by a mobile broadband Internet connection it is made possible to transmit, similarly to a contemporary peer-to-peer system for exchanging music data, information on other sections of a route to drivers of the individual motor vehicles in a motor vehicle fleet 10 via direct communication with other motor vehicles or by access to vehicle camera data/sensor data of other motor vehicles. It is therefore possible for drivers to find out quickly what, for example, is happening further forward in a traffic jam or what the current situation (weather, images) is at a planned destination. In addition it is also possible to assess the quality of various routes (road, view, weather). Image data can be received from other motor vehicles for this purpose. In addition, authorities for administering and ensuring safety on roads can also determine current information about obstacles (for example wild animals, objects on the roadway, accidents and an assessment of the severity of an accident). As a result it is also possible to adapt fleet information more quickly to current conditions and to remove obstacles as quickly as possible or to warn other car drivers more precisely about the location and the type of an obstacle on a roadway.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for making available current route information, comprising:

setting up a communication link to a peer-to-peer network by a communication device of a motor vehicle;

signing in the motor vehicle to the peer-to-peer network as a first subscriber of the peer-to-peer network, the motor vehicle being signed in so that a communication address of the motor vehicle can be determined by a second subscriber of the peer-to-peer network;

receiving an interrogation relating to the route information, the interrogation being received by the communication device from the second subscriber;

determining the route information by a sensing device of the motor vehicle, the route information including at least one of a route report and operating data of the motor vehicle, wherein the route report is produced from an input of a route section received as a speech signal from a person located in the motor vehicle, the input being received by the sensing device and converted into text data for the route report using speech-to-text technology, the operating data is dependent on a driving behavior of the motor vehicle and is determined by an analysis device of the motor vehicle, the operating data including at least one of road quality information and traffic information, the road quality information is produced from active chassis control signals from the sensing device, which are analyzed to draw conclusions about road quality, the road quality information being more compact, and requiring a smaller bandwidth than would be necessary to transmit individual active chassis control signals, and the traffic information is an indication of a traffic jam or backed-up traffic and is produced if the sensing device detects that a frequency of braking maneuvers within a predetermined time is greater than a limiting value; and transmitting the route information to the second subscriber from the communication device.

2. The method as claimed in claim 1, wherein
description data of the motor vehicle is transmitted by the communication device to the peer-to-peer network at least once, and
the description data identifies a current position of the motor vehicle and/or identifies whether the route information includes a route report, operating data including road quality information and/or operating data including traffic information.

3. The method as claimed in claim 1, wherein the route information includes sensor data relating to surroundings of the motor vehicle, the sensor data being sensed by the sensing device.

4. The method as claimed in claim 3, wherein the sensor data includes at least one of image information from a camera sensing device, rain information from a rain sensing device, temperature information from a thermometer sensing device, distance information from a distance sensing device, and speed information from a speed sensing device.

5. The method as claimed in claim 1, wherein
the route information comprises at least one camera image, and
a predetermined object is located in the camera image and made unidentifiable by an image processing device.

6. The method as claimed in claim 5, wherein the predetermined object is a vehicle number plate and/or a face of a person.

7. The method as claimed in claim 1, wherein
the motor vehicle outputs an outgoing interrogation to another motor vehicle,
incoming route information is received from the other vehicle, and
the incoming route information is output to the person located in the motor vehicle.

8. The method as claimed in claim 7, wherein the outgoing interrogation is produced based on a request input by the person located in the motor vehicle.

9. The method as claimed in claim 8, wherein the request is input via a display device of the motor vehicle.

10. The method as claimed in claim 7, wherein
incoming route information is received from a plurality of other vehicles, and
the incoming route information is compiled to produce a compilation report, which is output to the person located in the motor vehicle.

11. The method as claimed in claim 7, wherein
the motor vehicle outputs an outgoing search interrogation and an outgoing data interrogation,
the outgoing search interrogation specifies the type of data being sought from other motor vehicles, and
the outgoing data interrogation requests data from at least one other motor vehicle identified by the peer-to-peer network as possessing the type of data.

12. The method as claimed in claim 11, wherein the outgoing search interrogation specifies the conditions under which the person located in the motor vehicle wishes to receive incoming route information.

13. The method as claimed in claim 11, wherein
the outgoing search interrogation specifies a desire for a camera image, and
the outgoing data interrogation requests the camera image from another motor vehicle identified by the peer-to-peer network as possessing the camera image.

14. The method as claimed in claim 1, wherein the route information is transmitted directly to the second subscriber.

15. The method as claimed in claimed in 1, wherein
the route information includes a route report, and
the route report includes a personal assessment of a traffic situation from a point of view of the person located in the motor vehicle.

16. The method as claimed in claim 1, wherein
the route information includes the route report, and
the route report is a verbal assessment from the person located in the motor vehicle describing specific road conditions.

17. A non-transitory computer readable storage medium storing a program which, when executed by a computer, causes the computer to carry out the method as claimed in claim 1.

18. An Internet server device, comprising:
a communication processor to:
set up a communication link to a communication device of a first motor vehicle;
sign in the first motor vehicle to a peer-to-peer network as a first subscriber of the peer-to-peer network, the first motor vehicle being signed in so that a communication address of the motor vehicle can be determined by a second subscriber of the peer-to-peer network;
transmit an interrogation relating to the route information, the interrogation being transmitted to the communication device and originating from the second subscriber;
receive the route information from the first motor vehicle, the route report being determined by a sensing device of the first motor vehicle, the route information including at least one of a route report and operating data of the first motor vehicle, wherein
the route report is produced from an input of a route section received as a speech signal from a person located in the first motor vehicle, the input being received by the sensing device and converted into text data for the route report using speech-to-text technology,
the operating data is dependent on a driving behavior of the first motor vehicle and is determined by an analysis device of the first motor vehicle, the operating data including at least one of road quality information and traffic information,
the road quality information is produced from active chassis control signals from the sensing device, which are analyzed to draw conclusions about road quality, the road quality information being more compact, and requiring a smaller bandwidth than would be necessary to transmit individual active chassis control signals, and
the traffic information is an indication of a traffic jam or backed-up traffic and is produced if the sensing device detects that a frequency of braking maneuvers within a predetermined time is greater than a limiting value; and
a transmitter to transmit a response to the second subscriber as a function of all route information received, wherein
the server device is configured to transmit interrogations to a plurality of motor vehicles, to receive respective route information therefrom and to compile the received route information according to a predetermined processing rule to form the response,
the server device is additionally configured to determine a value relating to an urgency of the response and to transmit the response to the second subscriber only if the value satisfies a predetermined urgency criterion.

19. A motor vehicle to make available current route information, comprising:
a communication device:
to set up a communication link to a peer-to-peer network
to sign in the motor vehicle to the peer-to-peer network as a first subscriber of the peer-to-peer network, the motor vehicle being signed in so that a communication address of the motor vehicle can be determined by a second subscriber of the peer-to-peer network;
to receive an interrogation relating to the route information, the interrogation being received by from the second subscriber; and
to transmit the route information to the second subscriber; and
a sensing device to determine the route information, the route information including at least one of a route report and operating data of the motor vehicle, wherein
the route report is produced from an input of a route section received as a speech signal from a person located in the motor vehicle, the input being received by the sensing device and converted into text data for the route report using speech-to-text technology,
the operating data is dependent on a driving behavior of the motor vehicle and is determined by an analysis device of the motor vehicle, the operating data including at least one of road quality information and traffic information,
the road quality information is produced from active chassis control signals from the sensing device, which are analyzed to draw conclusions about road quality, the road quality information being more compact, and requiring a smaller bandwidth than would be necessary to transmit individual active chassis control signals, and
the traffic information is an indication of a traffic jam or backed-up traffic and is produced if the sensing device detects that a frequency of braking maneuvers within a predetermined time is greater than a limiting value.

20. The motor vehicle as claimed in claim 19, wherein
the motor vehicle outputs an outgoing interrogation to another motor vehicle,
incoming route information is received from the other vehicle, and
the incoming route information is output as an acoustic speech signal to the person located in the motor vehicle.

* * * * *